US010512143B1

United States Patent
Ikehara et al.

(10) Patent No.: US 10,512,143 B1
(45) Date of Patent: Dec. 17, 2019

(54) METHOD FOR COMMISSIONING LIGHTING SYSTEM COMPONENTS USING VOICE COMMANDS

(71) Applicant: Universal Lighting Technologies, Inc, Madison, AL (US)

(72) Inventors: Masaaki Ikehara, Madison, AL (US); Travis L. Berry, Madison, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 0 days.

(21) Appl. No.: 16/257,695

(22) Filed: Jan. 25, 2019

Related U.S. Application Data (60) Provisional application No. 62/622,373, filed on Jan. 26, 2018.

(51) Int. Cl.
*H05B 37/02* (2006.01)
*H04L 29/12* (2006.01)

(52) U.S. Cl.
CPC ..... *H05B 37/0272* (2013.01); *H05B 37/0227* (2013.01); *H04L 61/20* (2013.01)

(58) Field of Classification Search
CPC ........................... H05B 37/0272; H04L 61/20
USPC ............................................ 700/75; 315/292
See application file for complete search history.

(56) References Cited

U.S. PATENT DOCUMENTS

| 8,159,156 | B2 | 4/2012 | Henig et al. |
| 8,729,808 | B2* | 5/2014 | Knibbe ............. H04B 10/1149 |
| | | | 315/151 |
| 9,192,028 | B2 | 11/2015 | Walma et al. |
| 9,451,678 | B2 | 9/2016 | Simons et al. |
| 9,521,724 | B1 | 12/2016 | Berry et al. |
| 9,629,227 | B2 | 4/2017 | Bello et al. |
| 9,747,196 | B2 | 8/2017 | Simonyi et al. |
| 9,854,653 | B1* | 12/2017 | Ackmann .......... H05B 37/0272 |
| 2008/0218087 | A1 | 9/2008 | Crouse et al. |
| 2011/0199004 | A1 | 8/2011 | Henig et al. |
| 2014/0328211 | A1 | 11/2014 | Holleis et al. |
| 2014/0354161 | A1* | 12/2014 | Aggarwal .......... H05B 37/0245 |
| | | | 315/153 |
| 2014/0376747 | A1 | 12/2014 | Mullet et al. |

(Continued)

FOREIGN PATENT DOCUMENTS

WO 2017045885 A1 3/2017

*Primary Examiner* — Thuy V Tran
(74) *Attorney, Agent, or Firm* — Patterson Intellectual Property Law, P.C.; Gary L. Montle (57) ABSTRACT

A lighting control system is provided to reduce the time, cost, and potential for error during device commissioning. A controller is programmed to obtain voice commands from a user and to identify and implement device commissioning modes based at least on the obtained voice commands. In a first commissioning mode, the controller configures one or more buttons or equivalent actuators on a control switch mounted in association with a lighting zone. In a second commissioning mode, the controller assigns device grouping and/or configuration data for a plurality of lighting devices (e.g., lighting fixtures, occupancy sensors, light sensors) in operable connection with the control switch. The controller may further in another commissioning mode identify one or more second lighting devices added to or exchanged with one or more of the plurality of first lighting devices and assign device grouping and/or configuration data thereto.

19 Claims, 4 Drawing Sheets

(56) References Cited

U.S. PATENT DOCUMENTS

| | | | |
|---|---|---|---|
| 2015/0327348 A1 | 11/2015 | Dau | |
| 2016/0056629 A1* | 2/2016 | Baker | G05B 15/02 |
| | | | 700/276 |
| 2017/0038787 A1* | 2/2017 | Baker | H05B 37/0272 |
| 2017/0358315 A1 | 12/2017 | Saha et al. | |
| 2018/0228006 A1* | 8/2018 | Baker | H05B 37/0236 |
| 2019/0021155 A1* | 1/2019 | Van De Sluis | H05B 37/0272 |
| 2019/0098721 A1* | 3/2019 | Udavant | H05B 33/0863 |
| 2019/0116641 A1* | 4/2019 | Wilson | H05B 33/0845 |

* cited by examiner

METHOD FOR COMMISSIONING LIGHTING SYSTEM COMPONENTS USING VOICE COMMANDS

CROSS-REFERENCES TO RELATED APPLICATIONS

This application claims benefit of U.S. Provisional Patent Application No. 62/622,373, filed Jan. 26, 2018, and which is hereby incorporated by reference.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND

The present invention relates generally to lighting control systems. More particularly, the present invention relates to methods for automated commissioning of devices used in a lighting control system, such lighting devices including for example occupancy sensors, light sensors, switches, and light fixtures.

Lighting devices such as light emitting diode (LED) drivers frequently have their operating parameters configured before shipping to customers for installation. Various operating parameters of the LED driver are typically re-configured at other stages of application, as for example when a driver is first removed from its packaging it may be desired to apply a default configuration to satisfy the needs for most of the LED drivers at a particular installation. Once a new driver is installed with other LED drivers in a luminaire, it may also be required that all the drivers in the luminaire or series of luminaires receive a configuration unique to their installation. Further, any lighting device or group of lighting devices installed in a particular location or defined area will generally need to be configured for operable control by or communication with any local switch or equivalent control unit.

Today, the commissioning activity is performed via several methods. One method requires an individual to walk throughout the facility and assign and/or record unique addresses for each device. This information is then stored locally in the devices and entered, either real-time or thereafter, into a controller. The unique addresses are stored in the devices via a variety of means including but not limited to dip switches, infrared, radio, or directly by the IC manufacturer or during installation of the product firmware. One disadvantage of this arrangement is the time and cost associated with the various steps necessary during walk-through and assigning of devices. Accordingly, it would be desirable to reduce the time, cost and possibility of error during commissioning.

BRIEF SUMMARY

An exemplary system and method as disclosed herein simplifies commissioning by using voice commands to dictate actions for the system, assigning groups, and setting the associations. According to certain embodiments, speech recognition may be enabled by a microphone attached to a switch that is fixed in a defined area. The speech recognition is used to set up the device grouping and configuration, and further to detect one or more replacement parts and assign them to the existing group.

In an embodiment, a lighting control system comprises a first device mounted in association with a lighting zone to be commissioned and comprising data storage, and a plurality of second devices in operable connection with the first device. The first and second devices may include, for example, occupancy sensors, switches, light fixtures, light sensors, etc. A controller is configured upon actuation of a commissioning mode via the first device, to direct the performance of a set of commissioning operations for each of the plurality of second devices. The controller may for example be an application specific computer or a general-use computer connected to a central control structure. The aforementioned operations include providing an audio and/or visual notification corresponding to at least one of the plurality of second devices, translating voice commands received via a microphone operably associated with the first device into device configuration data, and storing the device configuration data in the data storage and in association with an address for the at least one of the plurality of second devices.

In one exemplary aspect of said embodiment, the microphone is fixed in association with the first device.

In another exemplary aspect of said embodiment, the actuating of the commissioning mode comprises receiving a first voice command via the microphone.

In another exemplary aspect of said embodiment, the actuating of the commissioning mode comprises user interaction with a physical actuator fixed in association with the first device.

In another exemplary aspect of said embodiment, the first device further comprises a first wireless transceiver, and the actuating of the commissioning mode comprises detecting proximity of the first wireless transceiver with respect to another wireless transceiver associated with a commissioning user.

In another exemplary aspect of said embodiment, the plurality of second devices are independently commissioned via a corresponding plurality of sequential sets of commissioning operations.

In another exemplary aspect of said embodiment, the operation of providing an audio and/or visual notification for a given set of commissioning operations comprises causing a respective one of the plurality of second devices to generate a lighting effect.

In another exemplary aspect of said embodiment, the controller is responsive to a powering-on mode to identify any one or more second devices coupled to the first device that have been added to or exchanged into a previous group of second devices coupled to the first device, and further upon subsequent actuation of a commissioning mode via the first device to direct performance of the set of commissioning operations for the identified one or more second devices.

In another exemplary aspect of said embodiment, the commissioning mode comprises a first commissioning mode for the plurality of second devices, and the first device comprises a plurality of manual actuators, with each manual actuator being selectively programmable to a function defined via received voice commands during a first device commissioning mode.

In another exemplary aspect of said embodiment, each of the plurality of manual actuators are programmable in association with a group of one or more second devices, each of the second devices assigned to a group via their respective configuration data.

In another exemplary aspect of said embodiment, during the first device commissioning mode a particular manual actuator is assigned to a particular group based on simultaneous actuation of the manual actuator and a defined voice command.

In another exemplary aspect of said embodiment, each of the plurality of manual actuators are programmable in association with a respective dimming setting for one or more lighting devices in the plurality of second devices coupled to the first device, and wherein during the first device commissioning mode a dimming setting is assigned to a particular actuator based on simultaneous actuation of the actuator and a defined voice command.

BRIEF DESCRIPTION OF THE SEVERAL VIEWS OF THE DRAWINGS

Hereinafter, embodiments of the invention are illustrated in more detail with reference to the drawings.

DETAILED DESCRIPTION

Referring generally to FIGS. 1-4, various exemplary embodiments of an invention may now be described in detail. Where the various figures may describe embodiments sharing various common elements and features with other embodiments, similar elements and features are given the same reference numerals and redundant description thereof may be omitted below.

Figure 1:
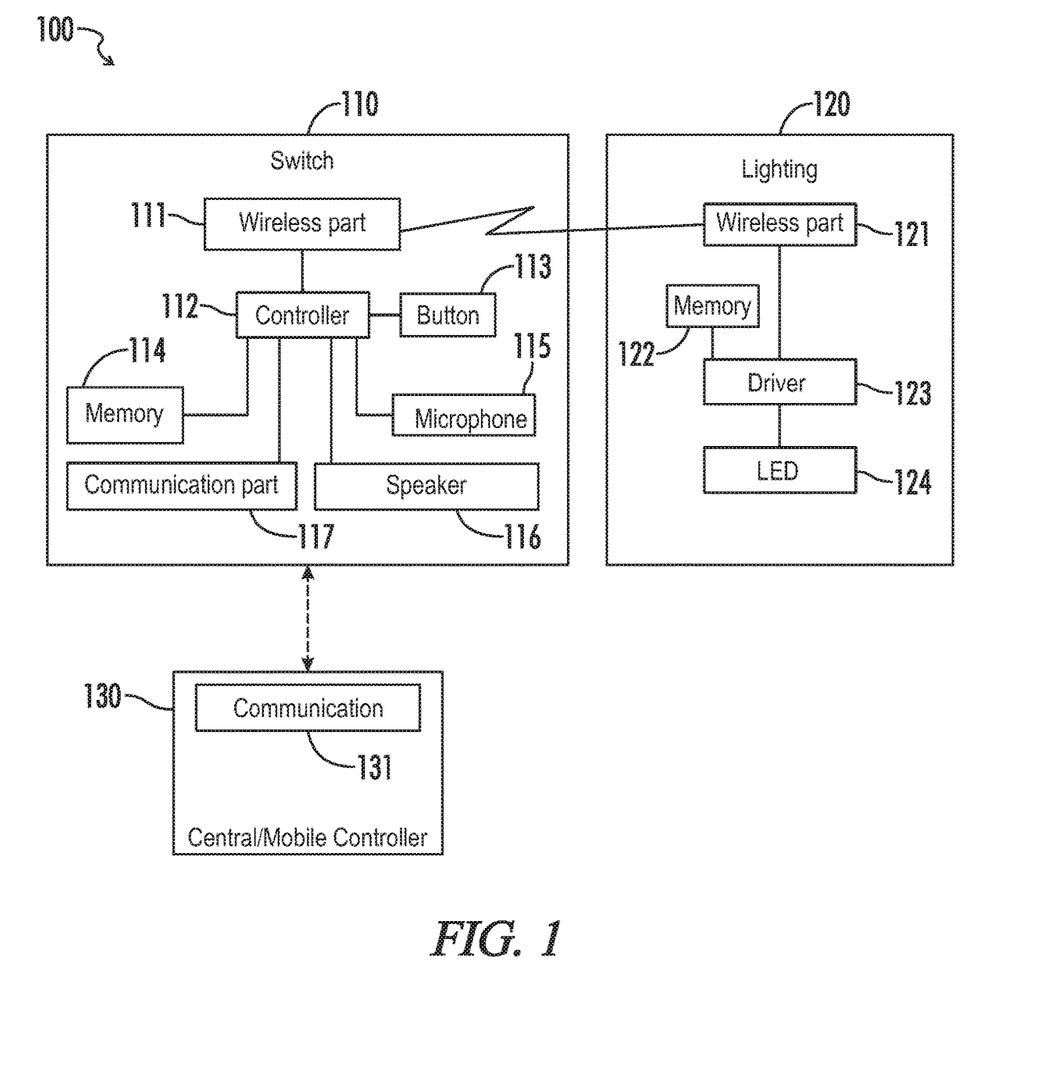
FIG. 1 is a block diagram representing an embodiment of a lighting control system as disclosed herein.

FIG. 1 illustrates an exemplary embodiment of a lighting control system 100 configured for implementing a commissioning process as disclosed herein. A first device 110 may for example be provided to communicate with each of one or more second devices 120 in a defined area. A single first device may be provided to communicate with one or more second devices distributable across one or more device groups in a single area, or alternatively more than one first device may be provided in a defined area for communications with a respective set of one or more second devices in the same area. A "first device" may be referred to hereinafter as simply a "switch" for illustrative purposes, but unless otherwise specifically stated may encompass numerous equivalent examples of wall-mounted or even portable/detachable user interfaces. A "second device" as referred to herein may encompass for example occupancy sensors (including infrared detection, sound detection, and/or other equivalent occupancy sensing means), light fixtures, light sensors, additional switches, and the like, as may be referred to hereinafter as "lighting devices."

The switch 110 as shown in FIG. 1 includes a wireless communication module 111 configured for communications with a corresponding wireless communication module 121 of one or more second devices 120. In certain embodiments more than one switch may be able to communicate with a given lighting device in an area, for example where the lighting device is within a certain proximity of the more than one switch. However, it may be that only one switch is arranged for communications with a set of one or more lighting devices, which themselves may be defined by the one switch in accordance with one or more control groups during a commissioning process as disclosed herein. The wireless communication module may in certain embodiments be replaced or supplemented with a wired communications interface with respect to one or more lighting devices.

The switch 110 as shown in FIG. 1 further includes a controller 112 linked to the wireless communication module 111 and further linked to: a manual interface 113 such as for example a plurality of externally arranged and user actuatable buttons; a storage unit such as memory 114 for storing program instructions, device information, firmware, or the like; a microphone 115 or equivalent audio input device; a speaker 116 or equivalent audio output device; and a communication module 117 configured to interface with a corresponding or otherwise compatible communication module 131 at a central controller 130. It should be noted that not all of the aforementioned elements are necessary, as for example a physical speaker in the switch is only required for certain features that are in no way required for certain embodiments of an invention as disclosed herein.

The aforementioned storage unit 114 may include a volatile or non-volatile memory medium. The storage unit may be a Random Access Memory (RAM), a Read-Only Memory (ROM), a Solid State Drive (SSD) or any other physical or virtual element capable of permanently and/or temporarily storing at least a portion of data associated with or used by or in conjunction with the controller 112. The storage unit may be configured in an exemplary embodiment to store one or more predetermined sets of data, such as device profiles or portion thereof, in relation to configuration and/or programming of one or more devices (e.g., one or more configuration designations).

Although each of the manual interface 113, memory 114, microphone 115, speaker 116 and communication module 117 are illustrated as being housed within the controller 112, one or more of these elements may be physically and/or logically distributed within or separate from the controller. For example, in one embodiment, at least a portion of the data storage may include a plurality of device configuration profiles (e.g., configuration designations) which are accessible remotely from a physical location of the controller. And, as previously noted herein, not all of said elements are necessary as a physical speaker in the switch is for example only required for certain features that are in no way required for certain embodiments of an invention as disclosed herein.

In an embodiment (not shown), a mobile computing device such as a smartphone having a resident software app or an application-specific commissioning device may be provided as a "first device" 110 configured to receive voice commands and conduct a device commissioning process as disclosed herein, wherein a wall-mounted switch or switch set linked to one or more lighting devices in an area may be commissioned as one of a plurality of "second devices." A communication link between first and second devices may include a gateway (not shown) for enabling communication between the controller of a first device and the various second devices of the system. The communication link may be any combination of wired and wireless connections and protocols, including a power line communication network, or Ethernet network. The optional gateway (not shown) may provide a link between an on-site communication network and an off-site communication network and/or adapt one communication protocol to another communication protocol on-site or off-site.

One example of a lighting device 120 as shown in FIG. 1 includes a light fixture having the aforementioned communication module 121 and a driver 123 for generating output power to a lighting load 124. In the present example, the driver is configured to produce DC current through a light source consisting of one or more light emitting diodes (LEDs) coupled in parallel and/or in series. Alternative examples of lighting loads and power supplies configured therefor are considered to be within the scope of the present disclosure to one of ordinary skill in the art. The driver may typically include a memory unit 122 associated with or otherwise as part of a lighting device controller (not separately shown) that is configured to generate control signals to regulate one or more operations of a power stage for the driver. In one example the power stage includes input terminals to receive input power from an external power supply, such as for example an AC mains input, and is configured to convert the AC input power to provide an appropriate output power for driving a light source, or load. The power stage may typically include an AC-DC section (not shown), configured for example as a diode bridge rectifier to convert the AC mains input into an intermediate DC bus voltage, and a DC-DC section (not shown) with switching circuitry, alone or as provided with additional rectifying circuitry, for further converting of the DC bus voltage into a DC output to the load. In an embodiment for example the DC-DC section may include a DC-AC stage wherein the switching circuitry produces an AC current through a primary winding of an isolation transformer, and an AC-DC stage including a secondary winding of the transformer and a diode bridge to rectify an AC current there through into an output DC current to the load.

A light fixture may include more than one lighting device 120 as disclosed herein, such as for example an LED driver may be separately provided with respect to a corresponding one or more LED modules, or the fixture may include an occupancy sensor, a light sensor, etc. Regardless of whether an occupancy sensor, a light sensor, or the like are provided as part of a light fixture or as independent second devices in an area and able to communicate with a given switch, these devices may be provided with their own respective wireless communication modules, controllers and/or memory units, and other associated occupancy sensing or light sensing components as are conventionally known in the art. Occupancy sensors, for example, may be provided in a stand-alone device or otherwise integrated in a light fixture, and may be designed to implement any of a number of available technologies such as imaging sensors (e.g., cameras), distance measuring (e.g., ultrasonic) sensors, magnetometers or the like.

Figure 2:
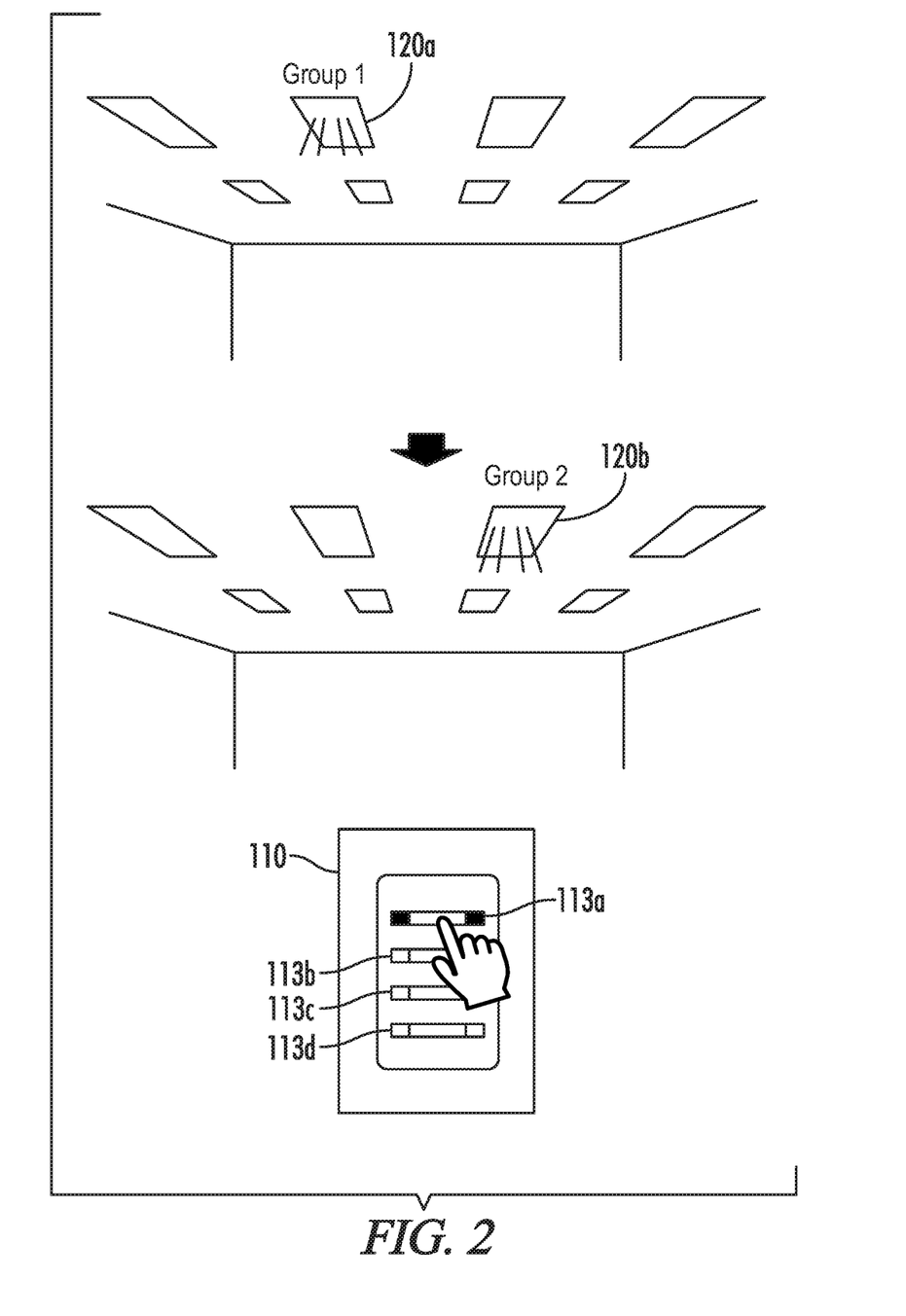
FIG. 2 is a graphical diagram representing exemplary components of the lighting control system of FIG. 1, designated to respective lighting control groups in accordance with a lighting control method as disclosed herein.

Referring to FIG. 2, an exemplary array of lighting devices 120 are illustrated in association with a wall switch 110 having four push buttons 113*a-d*. In one embodiment, the buttons may be associated with a certain set of functions during a device commissioning mode and another set of functions during a standard operation mode. For example, during the standard operation mode each button may be associated with and capable of turning on/off and/or dimming a designated group of lighting devices, whereas during the device commissioning mode each button may have a different programmed function or capability. Alternatively, one or more of the buttons may have dedicated commissioning functions only, whereas other of the buttons may have dedicated operating functions only, or some combination thereof. Generally speaking, each of the lighting devices are assigned to a group, area, or zone via their respective configuration data as received during the device commissioning mode, and the data may further define their interaction with other system devices or define their behavior. Exemplary configuration data may include parameters (or values associated with said parameters) such as minimum and maximum output currents, dimming curve (e.g., linear, logarithmic), dimming control voltages, on/off states for enabling or disabling various programmable features such as lumen maintenance, a threshold voltage for triggering on/off functions, a device type, a device name, a device label, a device group name, a device group label, etc. An appropriately "configured" lighting device such as an LED driver may properly regulate a lighting output of an associated lighting source based on dimming control data received during normal operating modes. The term "dimming control data" as used herein may refer to lighting device inputs corresponding to a lighting output such as a 0-100% dimming value, or an equivalent as allowable for the particular lighting device or load. Otherwise stated, the dimming control data may specify a desired lighting output, whereas the device configuration data may specify internal operating parameters enabling the device controller to appropriately provide the desired lighting output.

Figure 3:
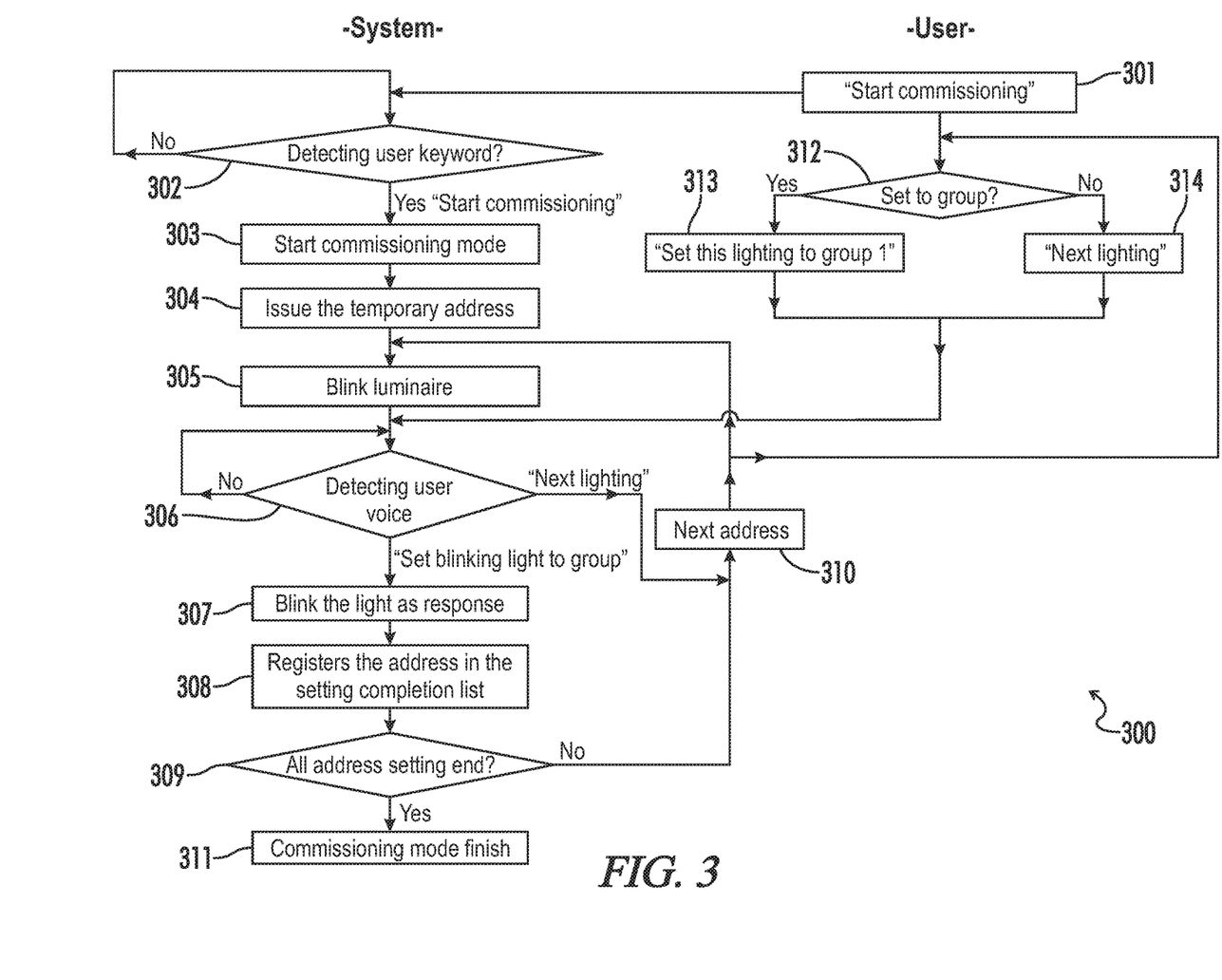
FIG. 3 is a flowchart representing an exemplary commissioning process for a lighting device according to a lighting control method as disclosed herein.

Referring next to FIG. 3 with exemplary and illustrative reference to the installed arrangement of luminaires and switches in FIGS. 1 and 2, an embodiment may now be described of an initial commissioning method 300 for one or more lighting devices. Each luminaire is installed in a range that is controllable from the switch. As previously noted, the connection method may be wireless (e.g. Bluetooth, ZigBee, Wi-Fi) or wired. In the embodiment described below, specific examples of voice commands or keywords may be provided, which are not intended as being limiting on the scope of any invention unless otherwise specifically stated. One of skill in the art may appreciate that any number or type of voice commands may be programmed to implement or otherwise accomplish the desired functions, and further that voice recognition, translation, and processing software as conventionally known in the art may be implemented by the disclosed system as a tool in providing the novel features disclosed herein.

The exemplary method 300 begins in step 301 with a user pressing the top button 113*a* on the wall switch 110. Then the user speaks aloud a voice command such as "start commissioning" to or sufficiently in the vicinity of the switch. As an alternative trigger to start commissioning, audible keywords may be used without requiring the user to press a button.

If the system detects the voice command from the user in step 302, the commissioning process is initiated 303, or otherwise the system continues to listen for an appropriate voice command. In an embodiment, if the system detects a voice command that is inappropriate for a particular current status or operating mode, the system may provide an audible or visual prompt to the user that the voice command has not been accepted.

In step 304, the system allocates respective addresses to the luminaires to which the switch can be connected. If the luminaire already has a device address, e.g., MAC address, this may be used.

The system then sends a signal to one of the addresses and blinks the luminaire 305. For example, the luminaire may receive a command to repeatedly flash ON/OFF every second and then waits until it detects a valid voice command from the user in step 306.

The user can visually identify the luminaire associated with the blinking lights and determine whether this luminaire is to be assigned to a current group 312. If so, the user may audibly designate a group association for the respective luminaire by saying, e.g., "set it to Group 1" in step 313. If not, the user may instruct the system to proceed to the next luminaire or other lighting device by saying, e.g., "next light" in step 314.

If the system detects the user's voice command indicating a different or next lighting device, it will proceed in step 310 to another of the lighting devices having an unset address, and further cause the next luminaire to blink in a repeat of step 305.

If the system detects the user's voice command indicating a group designation for the particular luminaire, the luminaire with the blinking light is defined internally in association with Group 1. The system may indicate that the luminaire has been registered in step 307 by, e.g., blinking the same luminaire briefly or by audible notification via the switch speaker. The system also registers the address in the setting completion list in step 308 wherein the system may subsequently distinguish between the registered addresses and unregistered addresses in the memory.

In step 309, the system determines if all of the luminaires connected (or in some cases connectable) to the switch have been registered with addresses. If so, the commissioning mode is completed 311 and the system may for example return to a standard operating mode until another commissioning mode is initiated by a user. In the standard operating mode, each lighting device may be controlled to operate according to states of the switch and further according to group settings and/or configuration data stored during the commissioning mode. For example, respective ON/OFF states for each of a plurality of switches or buttons associated with a wall-mounted switch unit may be associated with ON/OFF conditions for respective groups of lighting devices. As another example, respective ON/OFF states for each of the plurality of switches or buttons may correspond to a defined lighting condition or dimming state for each of the operably connected luminaires. In an embodiment, "configuration data" as provided to a particular device during a commissioning mode may represent at least a portion of the overall device configuration information, wherein for example at least one setting of the device is modified based at least in part upon the received configuration data. During the commissioning mode a lighting device may further provide a device type of the device back to the first device controller, wherein certain configuration data may be transmitted during the commissioning mode to all devices coupled to the lighting control system matching a corresponding device type.

If each operably connected luminaire has not been registered, the process may continue 310 with the next unregistered address and cause the associated luminaire to blink 305, or otherwise equivalent function for a different type of lighting device such as an occupancy sensor.

The commissioning process may differ slightly wherein an existing (previously installed) part of a group in the lighting system is changed, or a new luminaire is added to an existing group setting. In this case, the user may initiate the commissioning mode by pressing the top button on the wall switch and then saying "commissioning confirm" to or sufficiently proximate to the switch. As an alternative trigger to start the commissioning mode, audible keywords may be used without requiring the pressing of a button on the switch.

In response to the "commissioning confirm" (or equivalent) trigger, the system checks the memory for any one or more unset (non-commissioned status) addresses, and then allocates a temporary address to each exchanged luminaire. The system then sends a signal to one of the exchanged luminaires and blinks the luminaire. For example, the system may cause the luminaire to repeatedly turn ON/OFF each second.

The user can audibly discern the blinking luminaire and respond by provide a voice command such as "set it to Group 1," at which point the system may set the blinking luminaire as part of Group 1. The system indicates that the luminaire has been blinked briefly or registered by the speaker and registers the address in the setting completion list, wherein the system subsequently distinguishes between a registered address and an unregistered address. The user may continue by providing another voice command such as for example "Next lighting," wherein another one of the luminaires associated with an unset address blinks and the same process is repeated.

Figure 4:
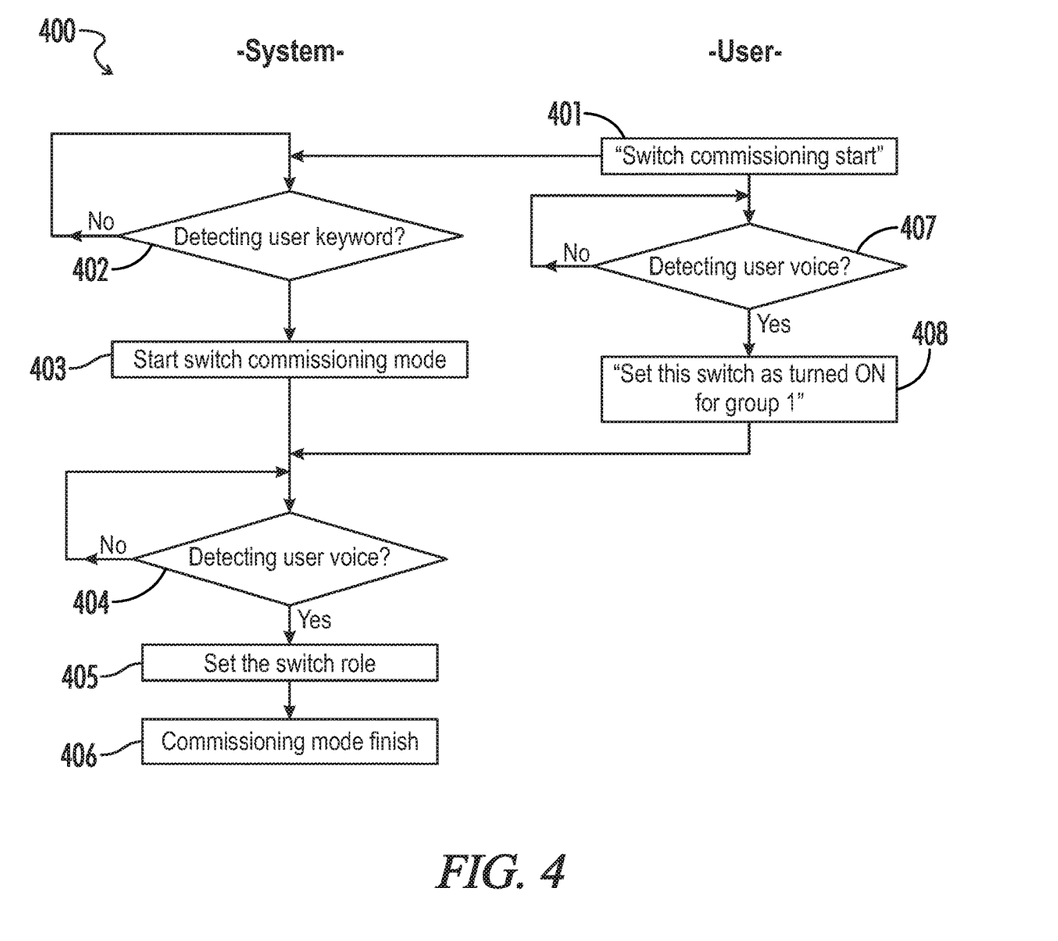
FIG. 4 is a flowchart representing an exemplary commissioning process for a switch device according to a lighting control method as disclosed herein.

Referring next to FIG. 4, an exemplary commissioning process 400 for a switch may now be described. This process may be conducted before, after, or as an alternative process with respect to the commissioning process for one or more lighting devices associated with the switch. In the embodiment described below, the switch at issue may be more particularly described as a switch unit having a plurality of buttons. Each given button in the switch unit may be associated with a given group of lighting devices, where the button corresponds to a simple ON/OFF state. As another example, one or more buttons in the switch unit may each alternatively be associated with a respective set dimming state for the lighting devices in a group generally associated with the switch unit. Generally stated, in a switch commissioning mode, the user may be enabled to set a group and/or a condition (e.g., a lighting output state) for each button of the switch, wherein for example when the button is engaged to provide an ON state for an associated group of lighting devices the respective lighting devices are controlled to a set lighting output.

As a preliminary step to the process, a switch is installed and connected or otherwise configured to be connectable to one or more lighting devices. The user may initiate the switch commissioning process by pressing a button to be set and then saying "switch commissioning start" 401 to the switch. If the system detects the voice command in the form of an actionable keyword 402, for example in combination with a precedent button engagement, the switch commissioning mode may be automatically initiated 403. The user may subsequently set a group setting and associated ON/OFF or dimming setting to the button by voice commands, for example while pressing the button or an associated switch component, for example "Set this switch as turned ON for group 1" 408. If the voice command is detected and validated by the system 404, the process may continue wherein the system sets the switch role 405 such that when the switch is turned ON a corresponding ON state is applied for group 1. The process may be repeated for each of the one or more buttons on a given switch unit, until each button has been set or otherwise the switch commissioning mode is terminated by user voice command 406.

As previously noted, the user may set each of a plurality of buttons in a switch unit to correspond to different dimming levels for a single lighting device group. Alternatively, the user may set each of a plurality of buttons in a switch unit to correspond to ON/OFF conditions for all lighting devices in a respective group, i.e., wherein one button is tied to a particular lighting device group.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct electrical connection between the connected items or an indirect connection through one or more passive or active intermediary devices.

The term "circuit" means at least either a single component or a multiplicity of components, either active and/or passive, that are coupled together to provide a desired function.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art.

Although embodiments of the present invention have been described in detail, it will be understood by those skilled in the art that various modifications can be made therein without departing from the spirit and scope of the invention as set forth in the appended claims.

A controller, computing device, or computer, such as described herein, includes at least one or more processors or processing units and a system memory. The controller may also include at least some form of computer readable media. By way of example and not limitation, computer readable media may include computer storage media and communication media. Computer readable storage media may include volatile and nonvolatile, removable and non-removable media implemented in any method or technology that enables storage of information, such as computer readable instructions, data structures, program modules, or other data. Communication media may embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A lighting control system comprising:
    a first device mounted in association with a lighting zone to be commissioned and comprising data storage;
    a plurality of second devices in operable connection with the first device; and
    a controller configured upon actuation of a commissioning mode via the first device, to direct the performance of a set of commissioning operations for each of the plurality of second devices, said operations comprising
        providing an audio and/or visual notification corresponding to at least one of the plurality of second devices,
        translating voice commands received via a microphone operably associated with the first device into device configuration data,
        storing the device configuration data in the data storage and in association with an address for the at least one of the plurality of second devices.

2. The system of claim 1, wherein the microphone is fixed in association with the first device.

3. The system of claim 2, wherein the actuating of the commissioning mode comprises receiving a first voice command via the microphone.

4. The system of claim 1, wherein the actuating of the commissioning mode comprises user interaction with a physical actuator fixed in association with the first device.

5. The system of claim 1, wherein the first device further comprises a first wireless transceiver, and the actuating of the commissioning mode comprises detecting proximity of the first wireless transceiver with respect to another wireless transceiver associated with a commissioning user.

6. The system of claim 1, wherein the plurality of second devices are independently commissioned via a corresponding plurality of sequential sets of commissioning operations.

7. The system of claim 6, wherein the operation of providing an audio and/or visual notification for a given set of commissioning operations comprises causing a respective one of the plurality of second devices to generate a lighting effect.

8. The system of claim 1, wherein the controller is responsive to a powering-on mode to identify any one or more second devices operably connected to the first device that have been added to or exchanged into a previous group of second devices operably connected to the first device, and further upon subsequent actuation of a commissioning mode via the first device to direct performance of the set of commissioning operations for the identified one or more second devices.

9. The system of claim 1, wherein the commissioning mode comprises a first commissioning mode for the plurality of second devices, and the first device comprises a plurality of manual actuators, with each manual actuator being selectively programmable to a function defined via received voice commands during a first device commissioning mode.

10. The system of claim 9, wherein each of the plurality of manual actuators is programmable in association with a group of one or more second devices, each of the second devices assigned to a group via their respective configuration data.

11. The system of claim 10, wherein during the first device commissioning mode a particular manual actuator is assigned to a particular group based on simultaneous actuation of the manual actuator and a defined voice command.

12. The system of claim 9, wherein each of the plurality of manual actuators is programmable in association with a respective dimming setting for one or more lighting devices in the plurality of second devices coupled to the first device, and wherein during the first device commissioning mode a dimming setting is assigned to a particular actuator based on simultaneous actuation of the actuator and a defined voice command.

13. A method of commissioning devices in a lighting control system, the method comprising:
detecting user activity corresponding to initiation of a first commissioning mode for a wall-mounted control switch and/or one or more lighting devices operably connected thereto;
for each of one or more sequential stages of the first commissioning mode, providing audible and/or visible indications of a manual actuator associated with the control switch or a lighting device of the one or more lighting devices as corresponding to the stage, and processing predefined voice commands to identify and store device grouping and/or configuration data for the control switch or lighting device corresponding to the stage;
upon completion of the first commissioning mode, entering a normal operating mode wherein the one or more lighting devices operate according to switch states of the control switch and the respectively stored device grouping and/or configuration data.

14. The method of claim 13, further comprising:
detecting user activity corresponding to initiation of a second commissioning mode for one or more lighting devices operably connected to the control switch in addition to or in place of the one or more of the one or more previously commissioned lighting devices connected to the control switch; and
for each of one or more sequential stages corresponding respectively to the one or more un-commissioned lighting devices associated with the second commissioning mode, providing audible and/or visible indications of a particular lighting device of the one or more lighting devices to be commissioned, and processing predefined voice commands to identify and store device grouping and/or configuration data for said lighting device.

15. The method of claim 14, wherein detecting activity corresponding to initiation of the second commissioning mode comprises:
detecting during a powering-on mode any one or more lighting devices operably connected to the control switch that have been added to or exchanged into a previous group of lighting devices operably connected to the wall-mounted control switch, and
further detecting a predefined voice command corresponding to the second commissioning mode.

16. The method of claim 13, wherein detecting user activity corresponding to initiation of a commissioning mode for a wall-mounted control switch and/or one or more lighting devices connected thereto comprises:
detecting a proximity of a first wireless transceiver with respect to a second wireless transceiver associated with the wall-mounted control switch, and
further detecting a first predefined voice command.

17. The method of claim 13, wherein detecting user activity corresponding to initiation of a commissioning mode for a wall-mounted control switch and/or one or more lighting devices connected thereto comprises:
detecting user actuation of a predefined switch state for a manual actuator associated with the control switch, and
further detecting a first predefined voice command.

18. The method of claim 13, wherein providing audible and/or visible indications of a lighting device of the one or more lighting devices comprises causing the lighting device to generate a lighting effect.

19. The method of claim 13, wherein the control switch comprises a plurality of manual actuators, with each manual actuator being selectively programmable to a function defined via received voice commands during the commissioning mode, for each one or more of the one or more lighting devices that are assigned to a group associated with the respective actuator.

* * * * *